United States Patent
Miyata et al.

(10) Patent No.: US 10,000,029 B2
(45) Date of Patent: Jun. 19, 2018

(54) TRANSMISSION BELT MANUFACTURING METHOD AND TRANSMISSION BELT

(71) Applicant: BANDO CHEMICAL INDUSTRIES, LTD., Kobe-shi (JP)

(72) Inventors: Hirofumi Miyata, Kobe (JP); Soichiro Nakane, Kobe (JP); Hisashi Izumi, Kobe (JP)

(73) Assignee: Bando Chemical Industries, Ltd., Kobe-shi, Hyogo (JP)

(*) Notice: Subject to any disclaimer, the term of this patent is extended or adjusted under 35 U.S.C. 154(b) by 0 days. days.

(21) Appl. No.: 15/232,602

(22) Filed: Aug. 9, 2016

(65) Prior Publication Data

US 2016/0347013 A1 Dec. 1, 2016

Related U.S. Application Data

(63) Continuation of application No. PCT/JP2015/000084, filed on Jan. 9, 2015.

(30) Foreign Application Priority Data

Feb. 12, 2014 (JP) .................................. 2014-024766

(51) Int. Cl.
*F16G 3/00* (2006.01)
*F16G 7/00* (2006.01)
(Continued)

(52) U.S. Cl.
CPC .............. *B29D 29/10* (2013.01); *B29C 35/02* (2013.01); *B29C 47/025* (2013.01); *B29C 65/48* (2013.01);
(Continued)

(58) Field of Classification Search
CPC ... F16G 5/20; F16G 5/06; C08L 23/16; C08L 2312/00; B29C 66/71
(Continued)

(56) References Cited

U.S. PATENT DOCUMENTS 3,926,703 A * 12/1975 Cantor ........................ C08J 5/10
156/124
3,991,255 A * 11/1976 Blaskiewicz ............ C08J 7/047
156/307.3
(Continued)

FOREIGN PATENT DOCUMENTS

EP 0253793 A2 1/1988
JP S63-86730 A 4/1988
(Continued)

OTHER PUBLICATIONS

Fumaric Acid as a Promoter of Adhesion in Vulcanized Synthetic Rubbers, J. Adhesion, vol. 50, pp. 25-42, May 1995.

*Primary Examiner* — Henry Y Liu
(74) *Attorney, Agent, or Firm* — Knobbe, Martens, Olson & Bear, LLP

(57) ABSTRACT

A method of manufacturing a power transmission belt includes: molding and vulcanizing an endless tension member layer in which a cord extending in a belt length direction is embedded; molding and vulcanizing a rubber member for a compressed rubber layer; and bonding together the tension member layer that has been vulcanized and the rubber member, that has been vulcanized, for the compressed rubber layer.

13 Claims, 11 Drawing Sheets

(51) Int. Cl.

| | | |
|---|---|---|
| *F16G 3/10* | (2006.01) | |
| *B29D 29/10* | (2006.01) | |
| *F16G 1/12* | (2006.01) | |
| *F16G 5/10* | (2006.01) | |
| *F16G 1/08* | (2006.01) | |
| *F16G 5/06* | (2006.01) | |
| *F16G 5/20* | (2006.01) | |
| *B29C 35/02* | (2006.01) | |
| *B29C 47/02* | (2006.01) | |
| *B29C 65/48* | (2006.01) | |
| *F16G 1/04* | (2006.01) | |
| *F16G 1/10* | (2006.01) | |
| *F16G 1/28* | (2006.01) | |
| *B29K 21/00* | (2006.01) | |
| *B29K 105/10* | (2006.01) | |
| *B29L 29/00* | (2006.01) | |

(52) U.S. Cl.
CPC ................. *F16G 1/04* (2013.01); *F16G 1/08* (2013.01); *F16G 1/10* (2013.01); *F16G 1/12* (2013.01); *F16G 1/28* (2013.01); *F16G 3/00* (2013.01); *F16G 3/10* (2013.01); *F16G 5/06* (2013.01); *F16G 5/10* (2013.01); *F16G 5/20* (2013.01); *B29K 2021/00* (2013.01); *B29K 2105/10* (2013.01); *B29L 2029/00* (2013.01)

(58) Field of Classification Search
USPC .................. 474/202, 204, 237, 260, 254
See application file for complete search history.

(56) References Cited

U.S. PATENT DOCUMENTS

| | | | | |
|---|---|---|---|---|
| 4,031,766 A * | 6/1977 | Beck | F16G 7/00 | 474/254 |
| 4,327,138 A * | 4/1982 | Hausch | B29C 65/4895 | 138/104 |
| 4,637,810 A * | 1/1987 | Beck | F16G 1/16 | 474/253 |
| 4,642,082 A * | 2/1987 | Mashimo | F16G 5/06 | 198/846 |
| RE33,389 E * | 10/1990 | Beck | F16G 1/16 | 474/253 |
| 5,244,436 A * | 9/1993 | Kurokawa | F16G 5/20 | 474/260 |
| 5,484,342 A * | 1/1996 | Beck | B29D 29/103 | 474/254 |
| 5,663,225 A * | 9/1997 | Ishida | C08K 5/3415 | 524/211 |
| 5,683,819 A * | 11/1997 | Mori | C08J 5/06 | 428/500 |
| 6,186,202 B1 * | 2/2001 | Majumdar | B60C 1/0016 | 152/209.6 |
| 6,287,685 B1 * | 9/2001 | Janssen | B32B 27/08 | 156/275.7 |
| 6,508,354 B2 * | 1/2003 | Breed | A63D 5/08 | 198/846 |
| 6,641,905 B1 * | 11/2003 | Fujimoto | B29D 29/10 | 264/501 |
| 6,739,996 B2 * | 5/2004 | Ueno | B29D 29/00 | 156/137 |
| 6,758,779 B2 * | 7/2004 | Fujimoto | B32B 25/02 | 474/260 |
| 6,962,639 B2 * | 11/2005 | Ito | B29D 29/085 | 156/137 |
| 7,781,528 B2 * | 8/2010 | Takehara | C08L 23/16 | 474/252 |
| 7,887,448 B2 * | 2/2011 | Hineno | F16G 5/20 | 474/263 |
| 7,901,313 B2 * | 3/2011 | Shiriike | F16G 5/20 | 474/260 |
| 8,002,922 B2 * | 8/2011 | Onita | F16G 5/20 | 156/137 |
| 8,118,966 B2 * | 2/2012 | Tamaki | B29C 65/18 | 156/304.1 |
| 8,329,282 B2 * | 12/2012 | Sueto | F16G 1/10 | 428/156 |
| 8,337,349 B2 * | 12/2012 | Fujiwara | C08J 3/243 | 474/263 |
| 9,273,756 B2 * | 3/2016 | Mitsutomi | B29D 29/103 | |
| 2001/0039226 A1 * | 11/2001 | Ito | B29D 29/085 | 474/263 |
| 2002/0036129 A1 * | 3/2002 | Breed | A63D 5/08 | 198/847 |
| 2003/0027920 A1 * | 2/2003 | Kinoshita | B29C 70/50 | 524/508 |
| 2003/0087715 A1 * | 5/2003 | Fujimoto | B32B 25/02 | 474/237 |
| 2004/0014544 A1 * | 1/2004 | Ito | B29D 29/085 | 474/251 |
| 2005/0096433 A1 * | 5/2005 | Takehara | C08L 23/16 | 525/211 |
| 2006/0105874 A1 * | 5/2006 | Shimamura | F16G 1/28 | 474/266 |
| 2006/0154770 A1 * | 7/2006 | Takaba | F16G 5/20 | 474/263 |
| 2007/0060431 A1 * | 3/2007 | Hineno | F16G 5/06 | 474/263 |
| 2007/0082777 A1 * | 4/2007 | Nishida | F16G 5/06 | 474/237 |
| 2007/0249450 A1 * | 10/2007 | Shiriike | F16G 5/20 | 474/260 |
| 2008/0139709 A1 * | 6/2008 | Piccirilli | C08L 9/02 | 524/99 |
| 2008/0286529 A1 * | 11/2008 | Sueto | F16G 1/10 | 428/167 |
| 2009/0048048 A1 * | 2/2009 | Nakamura | B29D 29/103 | 474/263 |
| 2009/0186733 A1 * | 7/2009 | Fujiwara | C08J 3/243 | 474/264 |
| 2010/0021676 A1 * | 1/2010 | Laubry | C08G 18/281 | 428/63 |
| 2010/0021729 A1 * | 1/2010 | Tamaki | B29C 65/18 | 428/343 |
| 2010/0173740 A1 * | 7/2010 | Mori | B29D 29/103 | 474/252 |
| 2010/0240809 A1 * | 9/2010 | Yamada | C08L 23/0815 | 524/81 |
| 2012/0165145 A1 * | 6/2012 | Kitano | B65G 15/32 | 474/264 |
| 2013/0217528 A1 * | 8/2013 | Matsumoto | F16G 1/10 | 474/263 |
| 2014/0205782 A1 * | 7/2014 | Obrecht | C08K 5/14 | 428/36.8 |
| 2014/0296010 A1 * | 10/2014 | Yoshida | B29D 29/103 | 474/190 |
| 2014/0323256 A1 * | 10/2014 | Yoshida | B29D 29/10 | 474/148 |
| 2014/0364262 A1 * | 12/2014 | Mori | B29D 29/103 | 474/265 |
| 2014/0378256 A1 * | 12/2014 | Tamura | F16G 5/08 | 474/265 |
| 2015/0148165 A1 * | 5/2015 | Matsuda | F16G 5/20 | 474/264 |
| 2015/0369335 A1 * | 12/2015 | Ishiguro | C08K 7/02 | 474/260 |

FOREIGN PATENT DOCUMENTS

| | | |
|---|---|---|
| JP | H8-300508 A | 11/1996 |
| JP | H9-240217 A | 9/1997 |
| JP | 2000-153558 A | 6/2000 |
| JP | 2001-316656 | 11/2001 |
| JP | 2003-222194 A | 8/2003 |
| JP | 2005-125742 A | 5/2005 |
| JP | 2007-15329 A | 1/2007 |

(56) References Cited

FOREIGN PATENT DOCUMENTS

| | | |
|---|---|---|
| JP | 2009-36302 | 2/2009 |
| JP | 2009-83450 A | 4/2009 |
| JP | 2010-507689 A | 3/2010 |

* cited by examiner

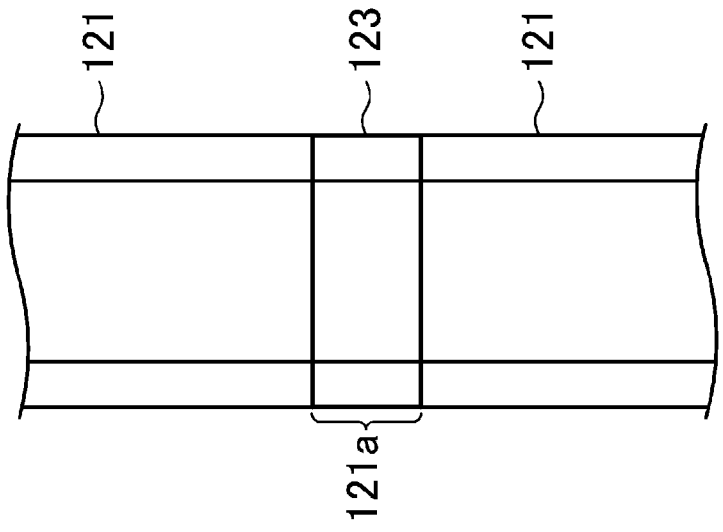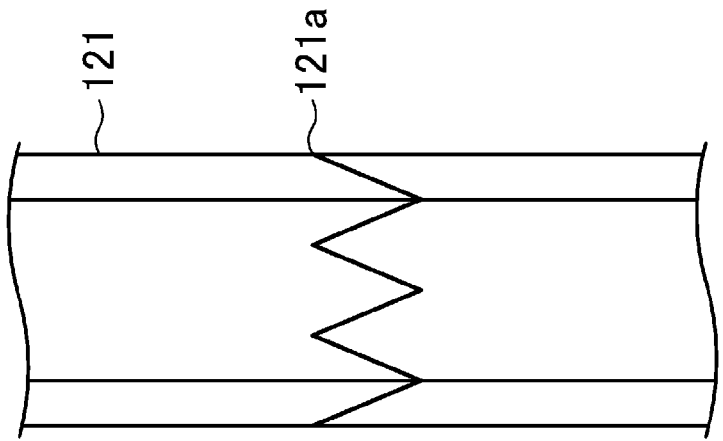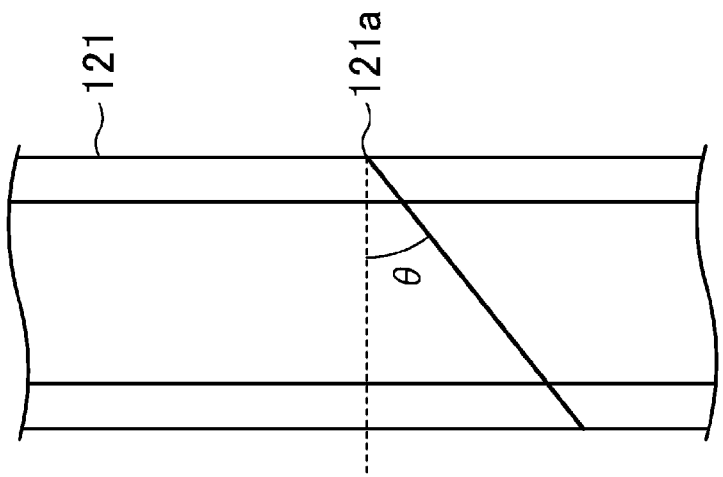

TRANSMISSION BELT MANUFACTURING METHOD AND TRANSMISSION BELT

CROSS-REFERENCE TO RELATED APPLICATIONS

This is a continuation of International Application No. PCT/JP2015/000084 filed on Jan. 9, 2015, which claims priority to Japanese Patent Application No. 2014-024766 filed on Feb. 12, 2014. The entire disclosures of these applications are incorporated by reference herein.

BACKGROUND

The present disclosure relates to a method of manufacturing a power transmission belt, and a power transmission belt.

A power transmission belt for use in power transmission generally includes a tension member layer in which a cord is embedded and helically spun along a belt length direction, and a compressed rubber layer provided with ribs extending in the belt length direction or uniformly spaced cogs in the belt length direction.

The cord of the power transmission belt is ideally helically spun on the same plane with uniform cord spacing. The power transmission belt is wound around pulleys, and runs while being pulled on a substantially straight line between the pulleys. If the cord is arranged on the same plane, a predetermined tension is uniformly applied to positions of the cord. However, if the arrangement of the cord is disorganized in the belt thickness direction, the following problems occur. For example, suppose that some portions of the cord are deviated radially outwardly. In such a situation, if the belt is wound around the pulleys such that the inner circumference of the belt is in contact with the pulleys, the radially outwardly deviated portion is wound around the pulleys with a large radius of curvature. As a result, the radially outwardly deviated portion is excessively pulled. Also, if the belt is wound around the pulleys such that the outer circumference of the belt is in contact with the pulleys, the radially outwardly deviated portion is wound around the pulleys with a small radius of curvature. As a result, the belt comes loose.

Also, when the cord is embedded and a layer underlying the cord is formed into the shape of a truncated cone, portions of the cord are wounded around one side of the underlying layer with a larger radius of curvature than around the other side of the underlying layer. When the belt in such a condition is wound around the pulleys arranged in a layout, a very strong tension is applied to portions of the cord wound around the side of the underlying layer with a smaller radius of curvature, and portions of the cord wound around the side of the underlying layer with a larger radius of curvature are significantly loose.

As can be seen, if the arrangement of the cord in the belt width direction is disorganized, and the cord is not arranged on the same plane, the tension is not uniformly applied to each of the portions of the cord, resulting in bending of the belt. This causes the belt to snake and to slip off from the pulleys. Also, the portions of the cord to which a strong tension has been applied may be cut early. If the cord is cut, the belt disadvantageously fractures from the cut portions of the cord.

Furthermore, if the arrangement of the cord in the belt width direction is disorganized, and the cord spacing in the width direction is not uniform, the tension which has been applied to the cord is transferred to the pulleys through a rubber member, and this tension serves as a force pulling the pulleys. Thus, in a portion where the cord spacing is small, an excessive force is applied to the rubber member, resulting in early separation between the cord and rubber or an early crack in the rubber.

In order to avoid such an early fracture in the belt, it is recommended to wind the cord around a cylindrical mold with substantially uniform cord spacing. Use of a flat belt may relatively easily provide such an ideal configuration. However, unlike the flat belt, in the case of using, e.g., a V-belt and V-ribbed belt, it is difficult to allow the cord to have an ideal configuration.

SUMMARY

For example, Japanese Unexamined Patent Publication No. 2005-125742 discloses the following method of manufacturing a V-belt. First, back surface canvas and unvulcanized adhesion rubber are wound around a flexible jacket attached on a cylindrical drum, and a cord is spun therearound. Then, unvulcanized compression rubber sheets are sequentially endlessly wrapped to form an unvulcanized laminated body. Thereafter, the jacket is expanded to press the laminated body onto an outer mold having V-formed protrusions, so that the unvulcanized compression rubber sheets are vulcanization-molded to have the shape contoured along the outer mold. In this method, even if the cord is ideally wounded in the unvulcanized state, the laminated body is deformed and the arrangement of the cord becomes disorganized not only in the width direction but also in the thickness direction in a situation where the jacket is expanded. Also, the laminated body is pressed onto the outer mold having the V-formed protrusions to deform the unvulcanized compression rubber sheets. Therefore, the arrangement of the cord under the unvulcanized compression rubber sheets becomes disorganized.

In the case of a wrapped belt, the following manufacturing method is also considered. First, an unvulcanized compression rubber sheet is wound around a cylindrical mold. Next, a cord is wound therearound so as to be arranged with uniform cord spacing. Furthermore, an unvulcanized rubber sheet is wound therearound. Next, the resultant is cut to have a predetermined width to form an unvulcanized laminated body. Subsequently, the lower portion of the laminated body is partially cut out, and reinforcing fabric is wound therearound. The laminated body around which the reinforcing fabric is wound is put into a mold, and is vulcanization-molded to form a final shape of a power transmission belt.

When unvulcanized rubber is cut, the rubber is deformed due to cutting resistance of a cutter. Thus, it is difficult to cut the unvulcanized rubber with a predetermined angle of a V-belt. Accordingly, the shape of the unvulcanized laminated body is not usually identical with that of the mold. Thus, when the laminated body is put into the mold, rubber moves. This disorganizes the arrangement of the cord.

Even if the unvulcanized laminated body can be cut to have the same shape as the mold, the laminated body is bent many times at steps since the cord is arranged and until the laminated body is put into the mold. This disorganizes the arrangement of the cord.

Other examples of the manufacturing method include a method in which an unvulcanized rubber sheet and cord are laminated on a cylindrical mold, an external pressure is then applied to the laminated substance to vulcanize the laminated substance, and the resultant is cut with a V cross-section to form a V-belt, and a method in which the resultant is cut into a predetermined shape to form a V-ribbed belt. In this case, the cord is wound, and then, multiple layers of the unvulcanized rubber sheet are laminated thereon. Therefore, individual thickness errors of the unvulcanized rubber sheet are accumulated, and the thickness of the vulcanized belt tends to be ununiform as a whole. As a result, the arrangement of the cord in the belt is disorganized.

It is an object of the present disclosure to provide a method of manufacturing a power transmission belt in which arrangement of cord is hardly disorganized.

An implementation of a method of manufacturing a power transmission belt according to the present disclosure includes: molding and vulcanizing an endless tension member layer in which a cord is embedded; molding and vulcanizing a rubber member for a compressed rubber layer; and bonding together the tension member layer that has been vulcanized and the rubber member, that has been vulcanized, for the compressed rubber layer.

In one embodiment of the method, the bonding may include pressing together a surface of the tension member layer and a surface of the rubber member for the compressed rubber layer which are activated by a free-radical initiator.

In another embodiment of the method, the bonding may be performed using an adhesive.

In another embodiment of the method, the bonding may include bonding together the tension member layer and the rubber member for the compressed rubber layer with an adhesive rubber sheet interposed therebetween.

In another embodiment of the method, the rubber member for the compressed rubber layer may be formed by extrusion molding.

In another embodiment of the method, in the bonding, both ends of the rubber member for the compressed rubber layer in a length direction may be bonded together.

Another embodiment of the method may further include, prior to the bonding, bonding together both ends of the rubber member for the compressed rubber layer in a length direction.

In another embodiment of the method, the tension member layer and the rubber member for the compressed rubber layer may be vulcanized under different conditions.

In another embodiment of the method, the forming and vulcanizing the rubber member for the compressed rubber layer may include forming and vulcanizing a first rubber member for a compressed rubber layer, and forming and vulcanizing a second rubber member for a compressed rubber layer, and the bonding may be bonding the first rubber member for the compressed rubber layer to an inner circumferential surface of the tension member layer, and bonding the second rubber member for the compressed rubber layer to an outer circumferential surface of the tension member layer.

In another embodiment of the method, the first rubber member for the compressed rubber layer and the second rubber member for the compressed rubber layer may be vulcanized under different conditions.

A power transmission belt according to a first embodiment of the present disclosure is manufactured by the method of manufacturing a power transmission belt according to the present disclosure.

A power transmission belt according to a second embodiment of the present disclosure includes: an endless tension member layer in which cord extending in a belt length direction are embedded; and a compressed rubber layer bonded to the tension member layer. The compressed rubber layer has an adhesive portion through which ends of compressed rubber layer in a belt length direction are bonded together.

A method of manufacturing a power transmission belt according to the present disclosure may hardly disorganize arrangement of cord, and allows a power transmission belt to be easily manufactured.

BRIEF DESCRIPTION OF THE DRAWINGS

FIGS. 11A-11C each illustrate an adhesive portion of a compressed rubber layer.

DETAILED DESCRIPTION

Figure 1A:
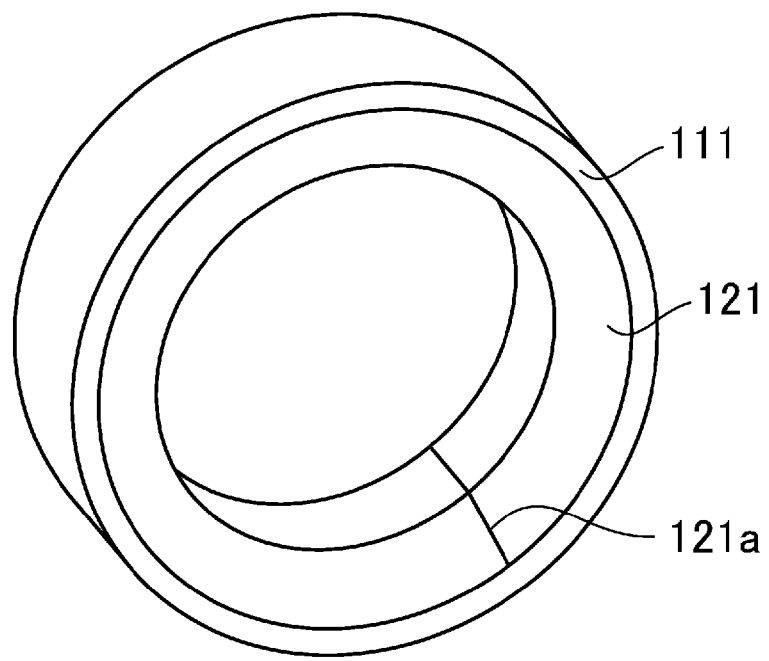
FIGS. 1A and 1B illustrate a power transmission belt according to an embodiment.
Figure 1B:
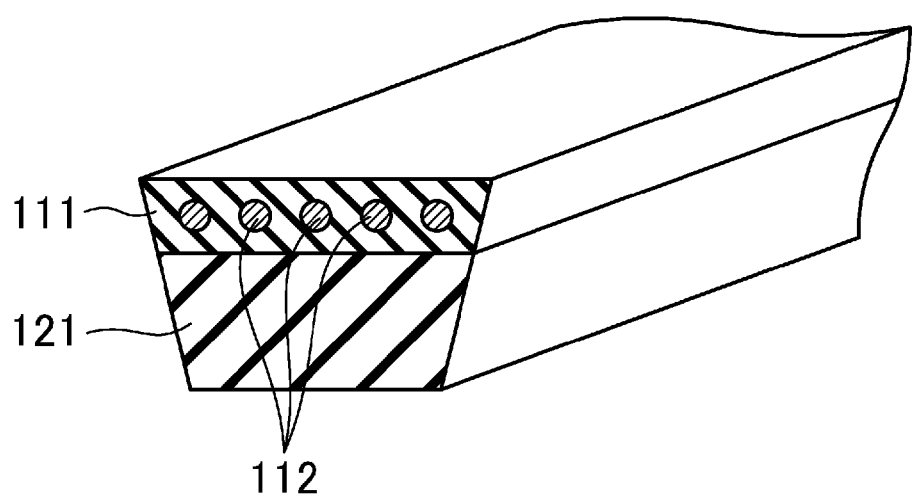
Figure 2A:
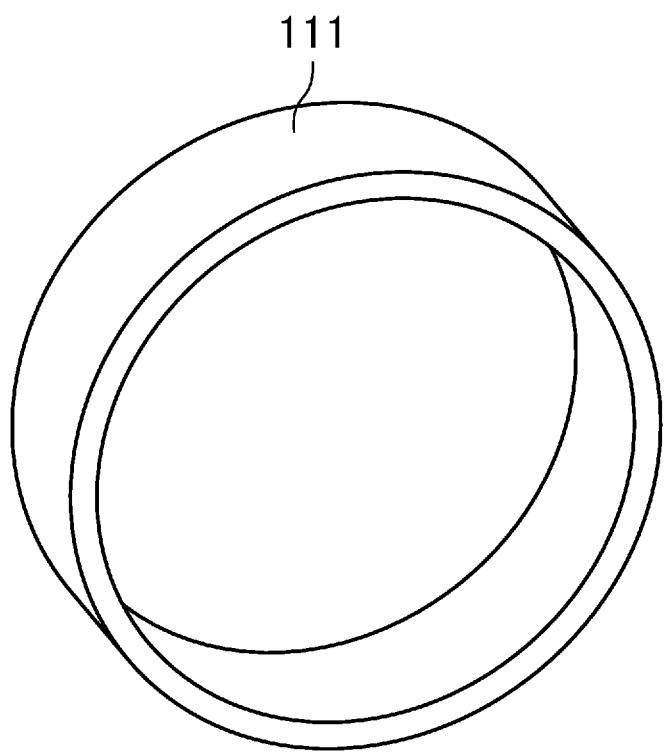
FIGS. 2A and 2B each illustrate a process step in a method of manufacturing a power transmission belt according to the embodiment.
Figure 2B:
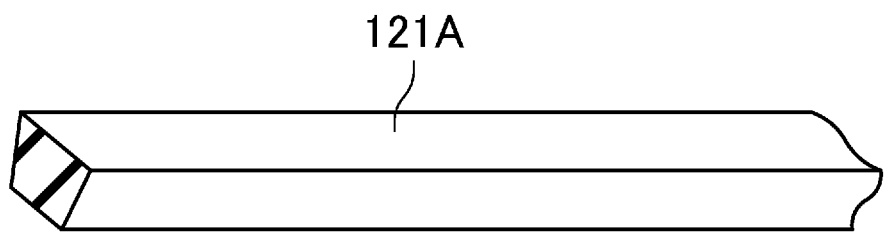

As illustrated in FIGS. 1A and 1B, a power transmission belt of this embodiment has a tension member layer 111 in which a cord 112 serving as a tension member is embedded, and a compressed rubber layer 121 having a working flank contacting a pulley. As illustrated in FIGS. 2A-3B, the power transmission belt of this embodiment can be formed by bonding together the tension member layer 111, which has been molded and vulcanized, and a rubber member 121A for a compressed rubber layer, which has been molded and vulcanized and will serve as a compressed rubber layer. Specifically, the belt can be formed as follows.

<Tension Member Layer>

Figure 4:
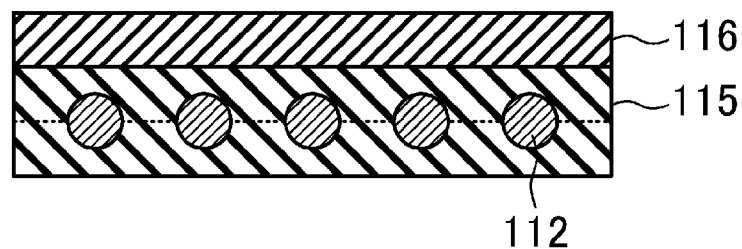
FIG. 4 is a cross-sectional view illustrating a tension member layer.

As illustrated in FIG. 4, the tension member layer 111 is an endless flat belt in which the cord 112 extending in the belt length direction and helically disposed with a predetermined pitch in the belt width direction are embedded. FIG. 4 illustrates an example where the tension member layer 111 has an adhesive rubber layer 115 and a cover rubber layer 116. The tension member layer 111 may have a trapezoidal cross section.

Figure 5:
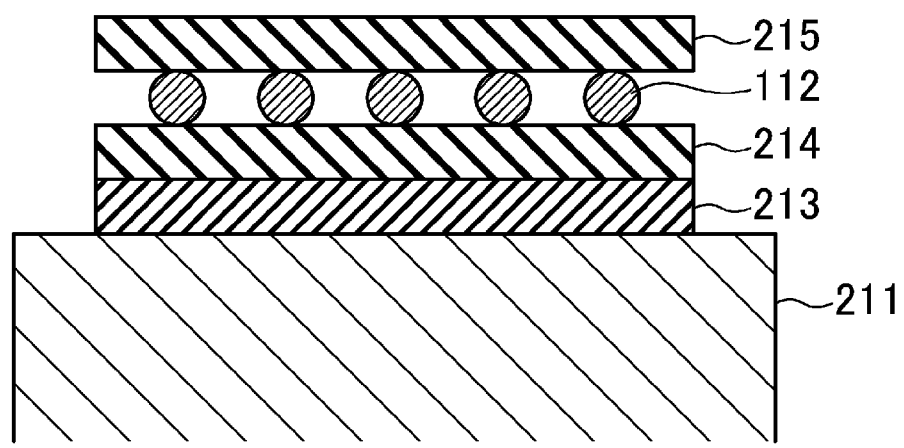
FIG. 5 illustrates a process step in a method of manufacturing the tension member layer.

An example of how the tension member layer 111 is molded and vulcanized will now be described. As illustrated in FIG. 5, a first unvulcanized rubber sheet 213, which will serve as the cover rubber layer 116, is wound around the outer circumferential surface of a cylindrical molding drum 211 with a smooth surface. Next, a second unvulcanized rubber sheet 214, which will serve as the adhesive rubber layer 115, is wound therearound. Next, the previously treated cord 112 is helically spun therearound with a predetermined pitch. Further, a third unvulcanized rubber sheet 215, which will serve as the adhesive rubber layer 115, is wound therearound to produce a cylindrical laminated body. After the laminated body on the mold is covered with a rubber sleeve, it is vulcanized. As a result, a cylindrical slab can be obtained, and then, is cut to have a predetermined width to obtain the endless tension member layer 111, as illustrated in FIG. 4.

In this method, the cord 112 is spun around the outer circumference of the cylindrical molding drum 211. Thus, it is easy to arrange the cord on the same plane at with uniform cord spacing. Also, no force is applied to deform the laminated body since the cord 112 is spun and until vulcanization is finished. Thus, there is no possibility of disorganizing the arrangement of the cord 112 in the thickness and width directions of the tension member layer 111 during the molding. Accordingly, this may easily provide the tension member layer 111 in which the cord 112 is arranged on the same plane with uniform cord spacing.

The laminated body may be vulcanized by, e.g., heating and pressurizing the laminated body in an vulcanizer and integrating together the unvulcanized rubber sheets that have been laminated. The vulcanization temperature may be set to be about 100-180° C., the pressure may be set to be about 0.5-2.0 MPa, and the time may be set to be about 10-60 minutes.

The first to third unvulcanized rubber sheets 213-215 may be produced by mixing a rubber composition at a predetermined mixing ratio using, e.g., a kneader or a Banbury mixer, and then, performing, e.g., calendar molding or extrusion molding. The thickness of the unvulcanized rubber sheet may be set to be, but not particularly limited to, about 0.1-1 mm.

Examples of material rubber components of the first to third unvulcanized rubber sheets 213-215 include ethylene-a-olefin elastomers, such as natural rubber, isoprene rubber, butadiene rubber, styrene-butadiene rubber, chloroprene rubber, acrylonitrile-butadiene rubber, hydrogenated acrylonitrile-butadiene rubber, butyl rubber, chlorosulfonated polyethylene rubber, urethane rubber, ethylene-propylene rubber, and ethylene-propylene- diene rubber (EPDM).

For example, a crosslinker such as sulfur or an organic peroxide, an antioxidant, a processing aid, a plasticizer, a reinforcing material such as carbon black, and a filler may be mixed with the first to third unvulcanized rubber sheets 213-215. Short fibers may be mixed with the first to third unvulcanized rubber sheets 213-215. However, it is recommended that such short fibers should not be mixed with at least the second and third unvulcanized rubber sheets 214 and 215 which will serve as an adhesive rubber layer in terms of an adhesive property to the cord.

The thicknesses and compositions of the second and third unvulcanized rubber sheets 214 and 215 may be the same or different. The thicknesses and compositions of the first to third unvulcanized rubber sheets 213-215 may be the same or different.

The cord 112 may be selected as appropriate according to the characteristics of the desired belt. For example, it is possible to use a cord-like bundle of organic fibers such as aramid fibers, polyester fibers, polyamide fibers or rayon fibers, or inorganic fibers such as glass fibers or steel.

In the pretreatment of the cord 112, for example, the cord 112 may be immersed in a resorcin-formalin-latex (RFL) treatment solution to perform a baking treatment, and then, the resultant may be immersed in rubber cement as needed to be heated and dried. The immersion in the RFL treatment solution and the baking treatment may be repeated a plurality of times as needed. The rubber cement may be obtained by dissolving, in, e.g., toluene, rubber which is the same or similar rubber as that used for the rubber composition constituting the adhesive rubber layer.

Figure 6:
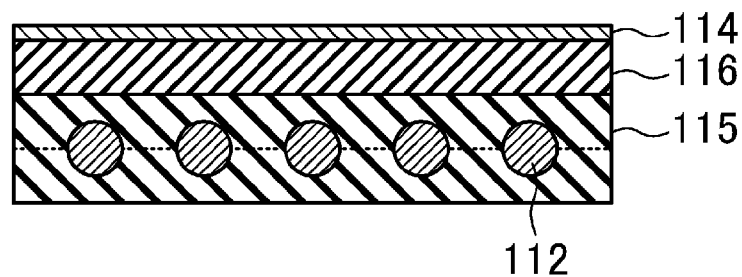
FIG. 6 is a cross-sectional view illustrating a variation of the tension member layer.

The tension member layer 111 may be molded and vulcanized not only by the above method but also by another method as long as the cord 112 can be arranged on the same plane with uniform cord spacing. Also, as illustrated in FIG. 6, canvas 114 may be vulcanized and bonded to the back surface of the tension member layer 111.

<Rubber Member for Compressed Rubber Layer>

An example of molding and vulcanization of the rubber member 121A for the compressed rubber layer, which will serve as the compressed rubber layer 121, will now be described. First, a rubber composition mixed at a predetermined mixing ratio is processed to have the shape of pellet or ribbon, and is supplied to a rubber extruder. An unvulcanized rubber member is continuously extrusion-molded into a desired shape using a die corresponding to the cross-sectional shape of the rubber member 121A for the compressed rubber layer. Next, this unvulcanized rubber member is vulcanized. This may provide the open-ended rubber member 121A for the compressed rubber layer.

Figure 7:
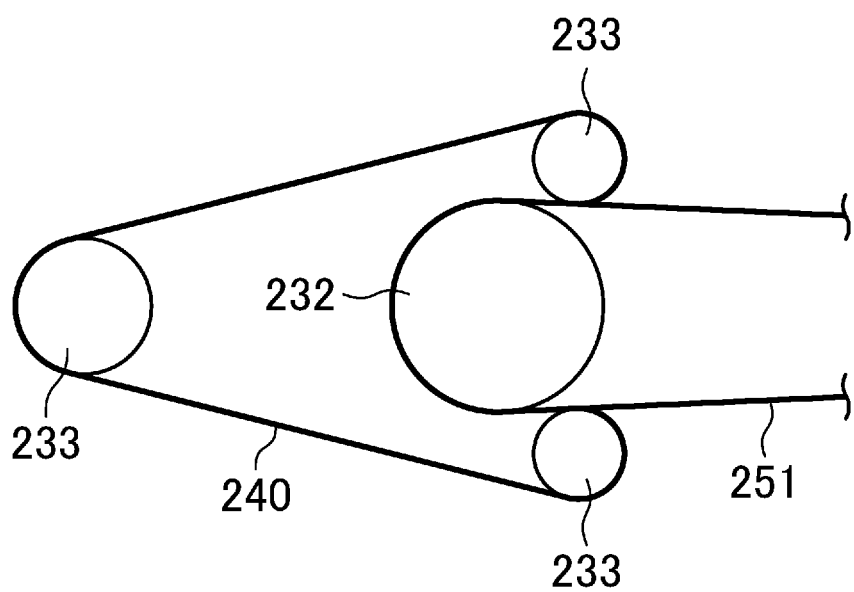
FIG. 7 illustrates a rotary curing press for use in manufacturing a rubber member for a compressed rubber layer.

The unvulcanized rubber member may be vulcanized using, e.g., an apparatus (rotary curing press) as illustrated in FIG. 7. In FIG. 7, a groove is formed in the outer circumferential surface of a metallic drum 232 along its circumferential direction to allow an unvulcanized rubber member 251 to just fit into the groove. The unvulcanized rubber member 251 is continuously supplied to the groove of the metallic drum 232. The unvulcanized rubber member 251 is sandwiched between the metallic drum 232 and a steel band 240 wound around pulleys 233, and is continuously pressed and vulcanized at a predetermined temperature and a predetermined pressure. The vulcanization temperature may be set to be, e.g., about 100-180° C., the molding pressure may be set to be, e.g., about 0.5-2.0 MPa, and the time may be set to be, e.g., about 10-60 minutes.

The rubber member 121A for the compressed rubber layer may have a composition according to the characteristics of the desired belt. Examples of material rubber components include ethylene-α-olefin elastomers, such as natural rubber, isoprene rubber, butadiene rubber, styrene-butadiene rubber, chloroprene rubber, acrylonitrile-butadiene rubber, hydrogenated acrylonitrile-butadiene rubber, butyl rubber, chlorosulfonated polyethylene rubber, urethane rubber, ethylene-propylene rubber, and ethylene-propylene-diene rubber (EPDM). Examples of compounding ingredients include a crosslinker such as sulfur or an organic peroxide, an antioxidant, a processing aid, a plasticizer, a reinforcing material such as carbon black, a filler, and short fibers.

Examples of the short fibers mixed with the rubber composition used for the rubber member 121A for the compressed rubber layer include polyamide short fibers, vinylon short fibers, aramid short fibers, polyester short fibers, and cotton short fibers. The short fibers have a length of 0.2-5.0 mm, and a fiber diameter of 10-50 μm, for example. The short fibers may be produced by cutting long fibers, which have been subjected to an adhesion treatment, i.e., which have been immersed into, e.g., an RFL aqueous solution and then heated, with a predetermined length along the length direction. The short fibers may be mixed as needed, and do not have to be mixed. When the rubber member 121A for the compressed rubber layer is extrusion-molded, the amount of the short fibers is adjusted, or any other process is performed, thereby allowing the short fibers to be oriented in a desired direction.

Figure 8:
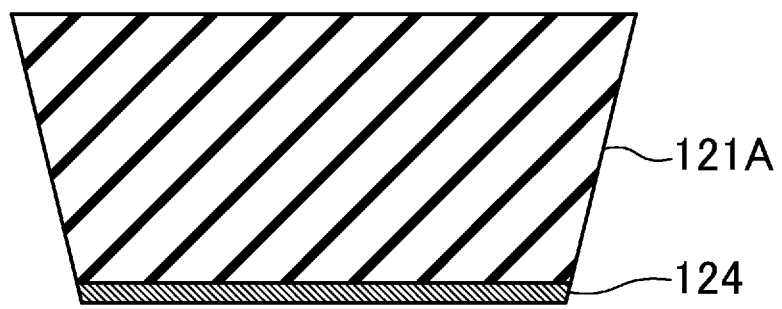
FIG. 8 is a cross-sectional view illustrating a variation of the rubber member for the compressed rubber layer.

The rubber member 121A for the compressed rubber layer is extrusion-molded and is continuously vulcanized. This may easily provide the rubber member 121A for the compressed rubber layer, having the same shape and the same characteristics. However, the rubber member 121A may be vulcanized by another method. For example, the unvulcanized rubber member may be vulcanized by normal planar press after being cut with a predetermined length. Also, the rubber member 121A for the compressed rubber layer may be formed by a method other than extrusion molding. As illustrated in FIG. 8, the rubber member 121A for the compressed rubber layer may have a surface bonded to canvas 124.

The examples of how to form the open-ended rubber member 121A for the compressed rubber layer have been described. Alternatively, when the open-ended unvulcanized rubber member is vulcanized, both ends of the member in the length direction may be vulcanized and bonded together, so that the rubber member has an endless shape at the time of finishing the vulcanization. Also, the unvulcanized rubber member may be molded and vulcanized to have an endless shape in advance, thereby forming the rubber member 121A for the compressed rubber layer.

<Bonding between Tension Member Layer and Rubber Member for Compressed Rubber Layer>

The tension member layer 111 and the rubber member 121A for the compressed rubber layer are bonded togetehr to obtain a power transmission belt having the tension member layer 111 and the compressed rubber layer 121. The tension member layer 111 and the rubber member 121A for the compressed rubber layer may be bonded together as follows.

—Use of Free-Radical Initiator—

The surface of the tension member layer 111 and the surface of the rubber member 121A for the compressed rubber layer are activated, and the activated surfaces are pressed together. Thus, the tension member layer 111 and the rubber member 121A for the compressed rubber layer may be bonded together. The surfaces are activated using a free-radical initiator.

The free-radical initiator may be applied to at least one of the tension member layer 111 and the rubber member 121A for the compressed rubber layer. The surface of the tension member layer 111 and the surface of the rubber member 121A for the compressed rubber layer are pressed together to bond together the tension member layer 111 and the rubber member 121A for the compressed rubber layer. The surfaces may be heated in pressing them together.

Examples of the free-radical initiator include a halogen donor compound such as trichloroisocyanuric acid or an organic peroxide. Examples of the halogen donor compound and the organic peroxide include, as disclosed in Japanese Unexamined Patent Publication No. 63-86730, glycoluril chloramine, 1,3-dichloro-5,5-dimethylhydantoin, 1,3,5-trichloro-2,4-dioxohexahydrotriazine, N-bromosuccinimide, N-chlorosuccinimide, cyanamide derivatives, N-chloroamino condensation products, dichloroisocyanuric acid, trichloroisocyanuric acid, and N-chlorosulfonamides. Examples of the N-chloroamino condensation products include dichloroazodicarbonamidine and N-chloromelamine. Examples of the N-chlorosulfonamides and their related compounds include a halogen donor compound such as chloramine-T, and an organic peroxide such as peroxide or hydroperoxide. Examples of the organic peroxide include di-t-butyl peroxide, t-butyl cumyl peroxide, di-cumyl peroxide, α,α'-bis(t-butyl peroxy)-p-di-isopropylbenzene, 2,5-dimethyl-2,5-di(t-butyl peroxy)-hexane, 2,5-dimethyl-di-(t-butyl peroxy)-hexane, 2,5-dimethyl-2,5-di(benzoyl peroxy) hexane, t-butyl peroxy isopropyl carbonate, and 1,1-bis(t-butyl peroxy)-3,3,5-trimethylcyclohexane.

—Use of Adhesive—

The tension member layer 111 and the rubber member 121A for the compressed rubber layer may also be bonded together using an adhesive. For example, the adhesive is applied to at least one of the tension member layer 111 and the rubber member 121A for the compressed rubber layer. Then, the surface of the tension member layer 111 and the surface of the rubber member 121A for the compressed rubber layer are pressed together to bond together the tension member layer 111 and the rubber member 121A for the compressed rubber layer. The surfaces may be heated in pressing them together.

Examples of the adhesive include a polyurea adhesive (see, e.g., Japanese Unexamined Patent Publication (translation of PCT application) No. 2010-507689), an adhesive including a silane coupling agent (see, e.g., Japanese Unexamined Patent Publication No. 9-240217), acrylic modified silicone resin, an elastic adhesive to be cured at normal temperature and humidity (e.g., Super-X Series commercially produced by CEMEDINE CO., Ltd.), a polyurethane adhesive (see, e.g., J Adhes, VOL. 50, No. 1, Page 25-42 (1995.05)), an adhesive including an epoxy compound, an adhesive including methacrylic acid alkyl ester polymer having a hydrolyzable silicon-containing group, and an adhesive including a rubber composition containing isocyanate (see, e.g., Japanese Unexamined Patent Publication No. 2001-316656).

Examples of the methacrylic acid alkyl ester polymer having a hydrolyzable silicon-containing group include SMAP (Kaneka Telechelic Polyacrylate) SA100S, SA110S, SA120, and SA200SX, and Kaneka MS Polymer S943 produced by Kanegafuchi Chemical Industries Co., Ltd. The adhesive including such a polymer as a main component may contain another component. For example, it may contain, e.g., at least one of carbon black, silica, and calcium carbonate. Also, it may contain a silane coupling agent. It may also contain, e.g., at least one of a typical hardener, a typical filler, a typical plasticizer, a typical softener, a typical thixotropic agent, a typical antioxidant, a typical antistatic agent, and a typical adhesiveness imparting agent.

The adhesive including the rubber composition containing isocyanate may be used by dissolving the rubber composition containing isocyanate in a solvent. Examples of the solvent include, but not particularly limited to, hydrocarbons, chlorinated hydrocarbons, ketones, and esters. It is recommended that the solvent have a low compatibility with water in consideration of the effect of humidity. It is more highly recommended that the solvent have a solubility parameter (SP) value of 18.4 $([J/cm^3]^{1/2})$ or less such that the solvent is hardly affected by, e.g., the humidity and temperature. Examples of the compound having an SP value of 18.4 $([J/cm^3]^{1/2})$ or less include n-hexane, toluene, cyclohexane, xylene, ethyl acetate, mineral spirit, petroleum ether, and ethyl ether. These compounds may be used alone or two or more of them may be used in combination.

Rubber compounding ingredients may be mixed with the rubber composition including isocyanate. Examples of the rubber compounding ingredients include, but not particularly limited to, a stiffener or filler such as carbon black, calcium carbonate, silica, clay, and talc, a tackifier such as a t-butylphenol resin, a coumarone resin, a terpene-phenol resin, a rosin derivative, and a petroleum hydrocarbon resin, an antioxidant such as N-phenyl-N'-isopropyl-p-phenylenediamine, and a vulcanizer such as MgO, ZnO, and PbO.

The adhesive including the rubber composition containing isocyanate is applied to at least one of the tension member layer 111 and the rubber member 121A for the compressed rubber layer, and the resultant is dried. Thereafter, the tension member layer 111 and the rubber member 121A for the compressed rubber layer are pressed together at a temperature of about 20-30° C. and a humidity of about 65% to securely bond them together.

An unvulcanized rubber composition may also be used as the adhesive. Specifically, a product obtained by dissolving the rubber composition in a solvent or dispersing the rubber composition into a dispersion medium may be used as the adhesive. The composition of the adhesive rubber composition may be selected as appropriate according to the composition of the tension member layer 111 and the composition of the rubber member 121A for the compressed rubber layer. Examples of rubber, as main components, include natural rubber, isoprene rubber, butadiene rubber, styrene-butadiene rubber, chloroprene rubber, acrylonitrile-butadiene rubber, hydrogenated acrylonitrile-butadiene rubber, butyl rubber, chlorosulfonated polyethylene rubber, urethane rubber, and ethylene-α-olefin elastomers, such as ethylene-propylene rubber and ethylene-propylene-diene rubber (EPDM), and their latexes. These components may be used alone or two or more of them may be used in combination.

Compounding ingredients such as a vulcanizer, a vulcanization accelerator, a reinforcing material, a filler, a plasticizer (softener), an antioxidant, and a processing aid may be added to the adhesive rubber composition.

The type of the vulcanizer is not particularly limited, and a typical rubber vulcanizer may be used. Examples of the vulcanizer include a sulfur-based crosslinker, an organic peroxide crosslinker, a metal oxide, a quinone dioxime compound, an isocyanate compound, and a nitrile oxide compound. They may be used alone or two or more of them may be used in combination.

The type of the vulcanization accelerator is not particularly limited, and a typical rubber vulcanization accelerator may be used. Examples of the vulcanization accelerator include a thiazole compound, a guanidine compound, a thiuram compound, a dithiocarbamate compound, an aldehyde-amine compound, a thiourea compound, a sulfonamide compound, a xanthate compound, an organic amine, hexamethylenetetramine, poly-p-dinitrosobenze, and N,N'-m-phenylenedimaleimide. They may be used alone or two or more of them may be used in combination.

As the reinforcing material, a well-known material such as carbon black, silica, and short fibers may be used. Well-known materials may also be used for the filler, the plasticizer, the antioxidant, the processing aid, and other compounding ingredients.

Examples of the solvent in which the adhesive rubber composition is dissolved or the dispersion medium into which the adhesive rubber composition is dispersed include an organic solvent such as aliphatic or alicyclic hydrocarbon, an aromatic compound, and alcohol, water, and their mixture.

The adhesive including the adhesive rubber composition is applied to at least one of the tension member layer 111 and the rubber member 121A for the compressed rubber layer. After the solvent or dispersion medium is evaporated, the tension member layer 111 and the rubber member 121A for the compressed rubber layer are pressed together, and heated at a temperature ranging from the room temperature to about 180° C., thereby bonding them together.

—Use of Adhesive Rubber Sheet—

Figure 9A:
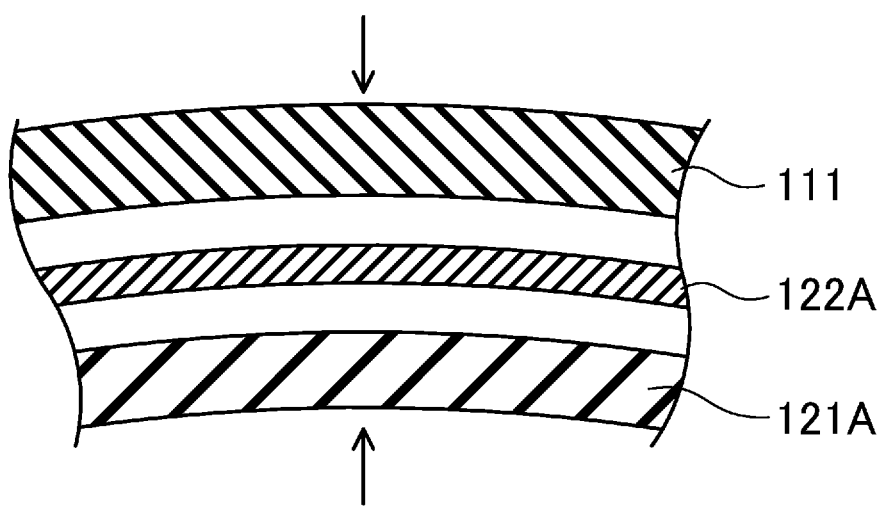
FIGS. 9A and 9B each illustrate a process step in a variation of the method of manufacturing a power transmission belt according to the embodiment.
Figure 9B:
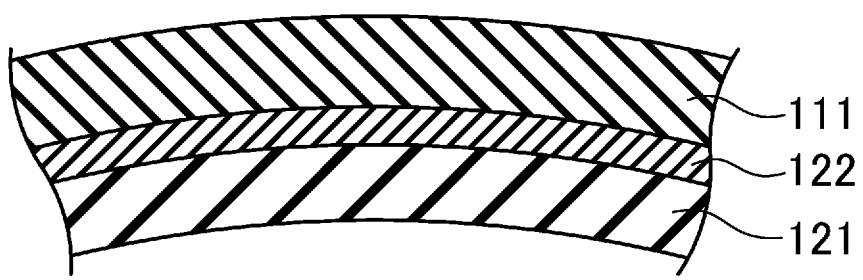

The tension member layer 111 and the rubber member 121A for the compressed rubber layer may be bonded together using an adhesive rubber sheet 122A formed by the adhesive rubber composition. For example, as illustrated in FIG. 9A, the tension member layer 111 and the rubber member 121A for the compressed rubber layer are pressed together with the adhesive rubber sheet 122A interposed therebetween, and are heated at a temperature ranging from the room temperature to about 180° C. This provides a power transmission belt in which the vulcanized, adhesive rubber sheet 122A is interposed between the tension member layer 111 and the compressed rubber layer 121, as illustrated in FIG. 9B.

The adhesive rubber sheet 122A may be formed by an adhesive rubber composition having the same or similar mixing ratio as/to the above-described adhesive rubber composition. The rubber composition may be mixed at a predetermined mixing ratio using, e.g., a kneader or a Banbury mixer, and then, e.g., a calendar molding or extrusion molding is performed to obtain a sheet having a thickness of about 0.1-1 mm.

The methods, described in this embodiment, of bonding together the tension member layer 111 and the rubber sheet 121A for the compressed rubber layer may be used in combination. For example, the tension member layer 111 and the rubber layer 121A for the compressed rubber layer may be bonded together by applying the free-radical initiator and adhesive to the surface of the tension member layer 111 and the surface of the rubber member 121A for the compressed rubber layer, and pressing them together. Alternatively, the tension member layer 111 and the rubber member 121A for the compressed rubber layer may be bonded together by activating the surface of the tension member layer 111 and the surface of the rubber member 121A for the compressed rubber layer by applying the free-radical initiator to the surfaces, and then, disposing the adhesive rubber sheet 122A between the tension member layer 111 and the rubber sheet 121A for the compressed rubber layer with the activated surfaces to press them together, and then, heating them at a predetermined temperature. Also, instead of the free-radical initiator, an adhesive may be applied to the surface of the tension member layer 111 and the surface of the rubber member 121A for the compressed rubber layer. Also, the free-radical initiator and the adhesive may be used in combination.

When the tension member layer 111 and the rubber member 121A for the compressed rubber layer are bonded together, at least one of the surface of the tension member layer 111 and the surface of the rubber member 121A for the compressed rubber layer may be subjected to a surface treatment. For example, a treatment such as a plasma treatment, a corona treatment, ultraviolet irradiation, or mechanical buffering may be performed. The surface may be treated using a dicarboxylic acid solution. These surface treatments may be used alone or two or more of them may be used in combination.

The tension member layer and the rubber member for the compressed rubber layer may be bonded together after they are, for example, cut to have a predetermined width in advance. Alternatively, after the tension member layer and the rubber member each having a greater width are bonded together, they may be cut to have a predetermined width.

<Bonding between Both Ends of Rubber Member for Compressed Rubber Layer>

If the vulcanized, the rubber member 121A for the compressed rubber layer is formed into an open-ended and string shape, both ends of the rubber member 121A for the compressed rubber layer in the length direction are bonded together, so that the rubber member 121A for the compressed rubber layer has an endless shape.

The both ends of the rubber member 121A for the compressed rubber layer may be bonded together by a method using a free-radical initiator, a method using an adhesive, a method using an adhesive rubber sheet, or their combination, in the same or similar manner as/to that in the bonding between the tension member layer 111 and the rubber member 121A for the compressed rubber layer. The free-radical initiator, the adhesive, and the adhesive rubber sheet used to bond together the tension member layer 111 and the rubber member 121A for the compressed rubber layer may be similarly used as those used to bond together the both ends of the rubber member 121A for the compressed rubber layer.

Figure 3A:
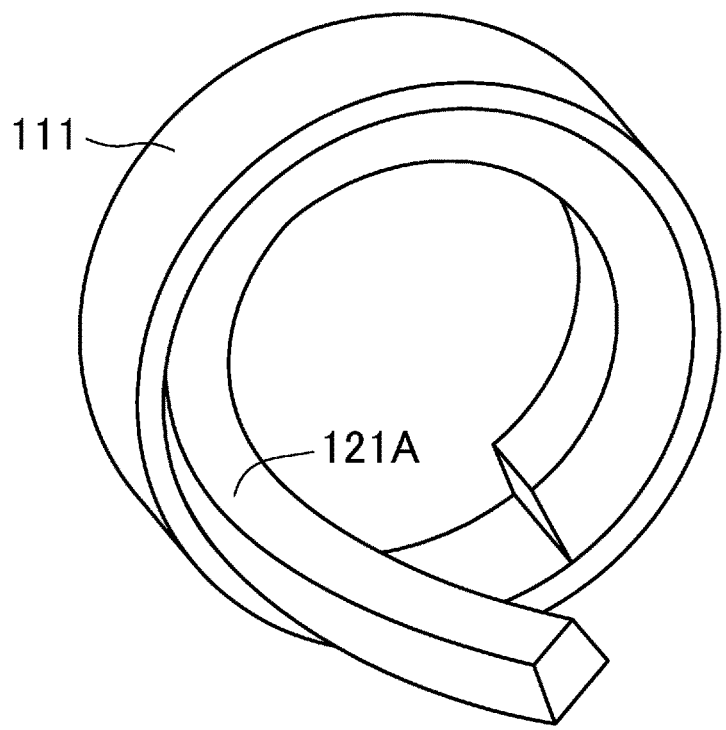
FIGS. 3A and 3B each illustrate a process step in the method of manufacturing a power transmission belt according to the embodiment.
Figure 3B:
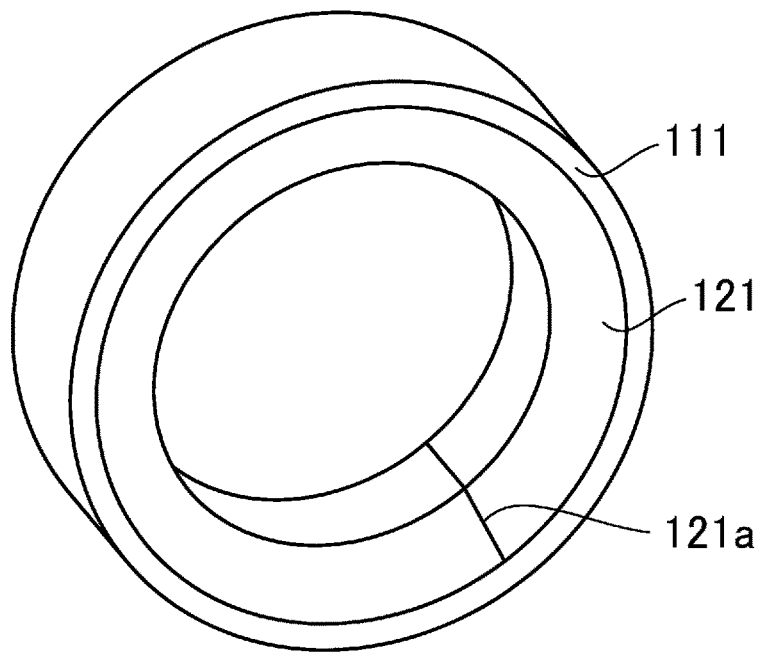
Figure 10:
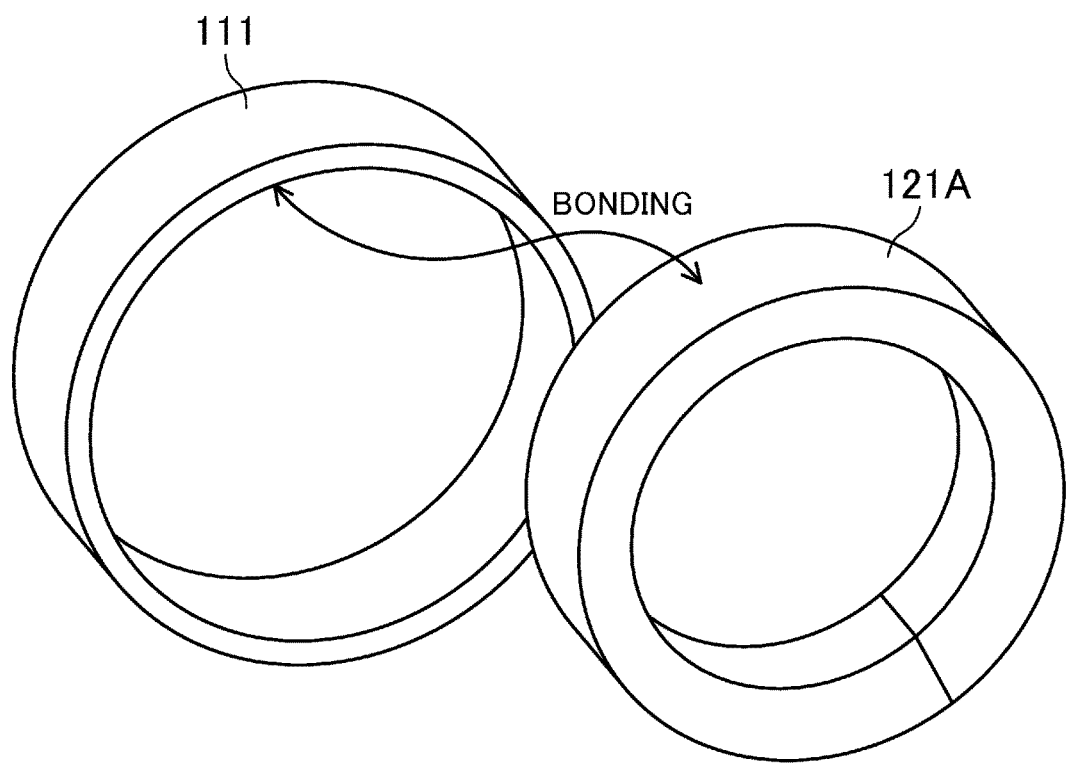
FIG. 10 illustrates a variation of the method of manufacturing a power transmission belt according to the embodiment.

The both ends of the rubber member 121A for the compressed rubber layer may be bonded together by the same or different method as/from that in bonding between the tension member layer 111 and the rubber member 121A for the compressed rubber layer. As illustrated in FIGS. 3A and 3B, the step of bonding together the both ends of the rubber member 121A for the compressed rubber layer and the step of bonding together the tension member layer 111 and the rubber member 121A for the compressed rubber layer may be performed simultaneously. As illustrated in FIG. 10, the both ends of the rubber member 121A for the compressed rubber layer may be bonded together prior to the bonding between the tension member layer 111 and the rubber member 121A for the compressed rubber layer, and then, the rubber member 121A formed into an endless shape may be bonded to the tension member layer 111. If the vulcanized, rubber member 121A for the compressed rubber layer has an endless shape, it is unnecessary to perform the step of bonding together both ends of the rubber member 121A for the compressed rubber layer in the length direction.

When the both ends of the rubber member 121A for the compressed rubber layer are bonded together, the adhesive surface may be subjected to a surface treatment. For example, a treatment such as a plasma treatment, a corona treatment, ultraviolet irradiation, or mechanical buffering may be performed. The surface may be treated using a dicarboxylic acid solution. These surface treatments may be used alone or two or more of them may be used in combination.

If the open-ended, rubber member 121A for the compressed rubber layer is used to produce the power transmission belt of this embodiment, the adhesive portion 121a may be formed in the compressed rubber layer 121, as illustrated in FIG. 1A. The both ends of the rubber member 121A for the compressed rubber layer in the length direction may have any shape as long as they may be bonded together. They may be cut diagonally so as to agree with each other. In this case, as illustrated in FIG. 11A, the adhesive portion 121a of the compressed rubber layer 121 is oblique to the length direction of the power transmission belt. This may increase the adhesive area and may make it difficult to form, e.g., steps in the adhesive portion. The joint angle θ of the adhesive portion 121a is not limited, but may be 45°, for example. Also, as illustrated in FIG. 11B, the uneven surfaces of the both ends may be fitted to each other to form finger joints. If the both ends of the rubber member 121A for the compressed rubber layer are bonded together using the adhesive rubber sheet, a vulcanized, adhesive rubber sheet 123 is interposed therebetween, as illustrated in FIG. 11C.

As described above, the rubber member that is formed into an endless shape and is vulcanized may also be used as the rubber member 121A for the compressed rubber layer. In this case, a power transmission belt in which the compressed rubber layer 121 has no adhesive portion 121a may be obtained.

As can be seen from the foregoing description, the method of manufacturing the power transmission belt of this embodiment allows the vulcanized tension member layer 111 and the vulcanized rubber member 121A for the compressed rubber layer to be bonded together. Thus, unlike a case where the tension member layer and the compressed rubber layer are integrally formed, even if a pressure is applied during the bonding, the arrangement of cord embedded in the tension member layer in the thickness and width directions is not disorganized. The same tension member layer 111 may be used in various power transmission belts, thereby significantly reducing the fabrication cost of the power transmission belts. If the rubber member 121A for the compressed rubber layer which will serve as the compressed rubber layer 121 is formed by extrusion-molding, not only the cost reduction but also improvement of dimension precision may be expected. Also, even if power transmission belts have different lengths, the same rubber member for the compressed rubber layer may be used. The tension member layer and the rubber member for the compressed rubber layer may be individually vulcanized. Thus, each member may be optimally vulcanized.

In this embodiment, the V-belt is described as an example. If the shape of the rubber member 121A for the compressed rubber layer is changed, various power transmission belts may be formed using the same tension member layer 111. For example, providing a plurality of grooves in the length direction may form a V-ribbed belt.

Figure 12A:
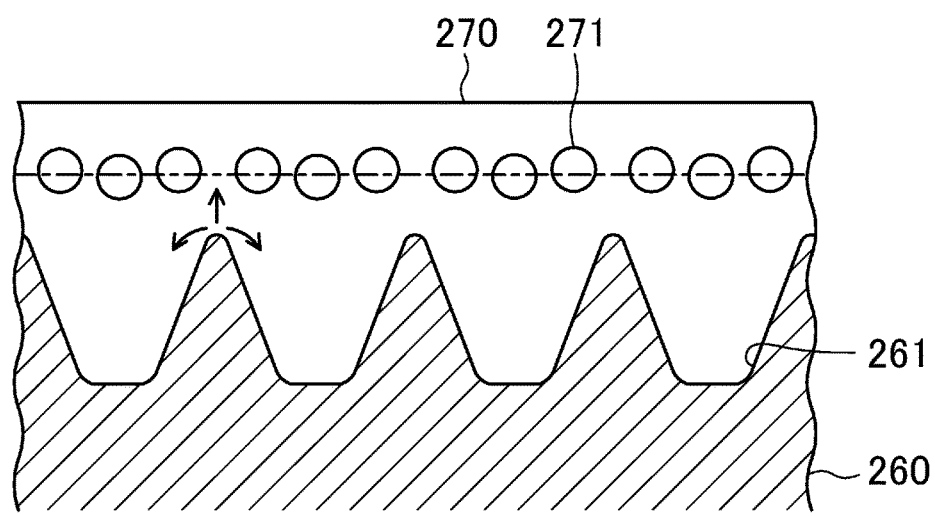
FIG. 12A illustrates a problem in a conventional method of manufacturing a V-ribbed belt.

A V-ribbed belt is manufactured by the following exemplary method (see, e.g., Japanese Unexamined Patent Publication No. 2009-36302). First, a laminated body in which a rubber sheet and a cord is laminated is formed. Subsequently, as illustrated in FIG. 12A, a laminated body 270 is pressed onto an outer mold 260 with grooves 261 to have unevenness, and is vulcanized while being pressed. In this case, since the unevenness is formed by deforming portions of the rubber by the grooves 261, portions of the rubber surrounding the grooves 261 are also deformed. Thus, portions of the rubber between the grooves 261 is laterally spread out, and is pushed up toward the cord 271. As a result, the vertical and horizontal positions of the cord 271 are changed between the grooves 261. The cord spacing of the cord 271 between the grooves 261 is widened, and the vertical position of the cord 271 is disorganized. The cord spacing of the cord 271 above the groove 261 is narrowed. As can be seen, in the conventional method of manufacturing a V-ribbed belt, even if the cord are regularly arranged in the thickness and width directions with a rubber sheet and the cord laminated, such an arrangement of the cord becomes disorganized when unevenness is formed.

Figure 12B:
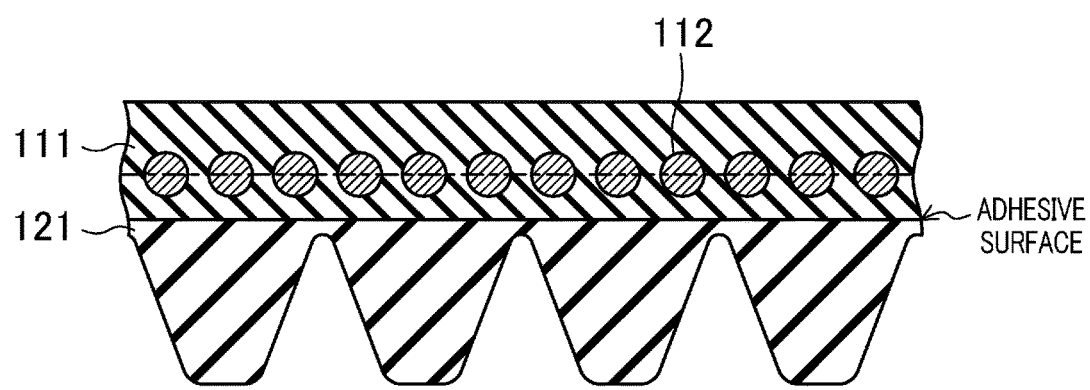
FIG. 12B illustrates a V-ribbed belt manufactured by a method according to the embodiment.

In the V-ribbed belt in which the arrangement of the cord is disorganized in its thickness and width directions, the tension between the cord greatly varies on a pulley and between pulleys. Therefore, the belt is likely to be cut from its portion with the highest tension, resulting in a decrease in lifetime of the belt. In contrast, according to the method of the present disclosure, the tension member layer 111 and the rubber member 121A for the compressed rubber layer are vulcanized, and then, bonded together. Therefore, no force is applied to the unvulcanized tension member layer 111 to disorganize the arrangement of the cord 112. Therefore, the arrangement of the cord 112 is hardly disorganized, and a V-ribbed belt may easily be provided in which the cord 112 is regularly arranged in its thickness and width directions as illustrated in FIG. 12B.

Figure 13:
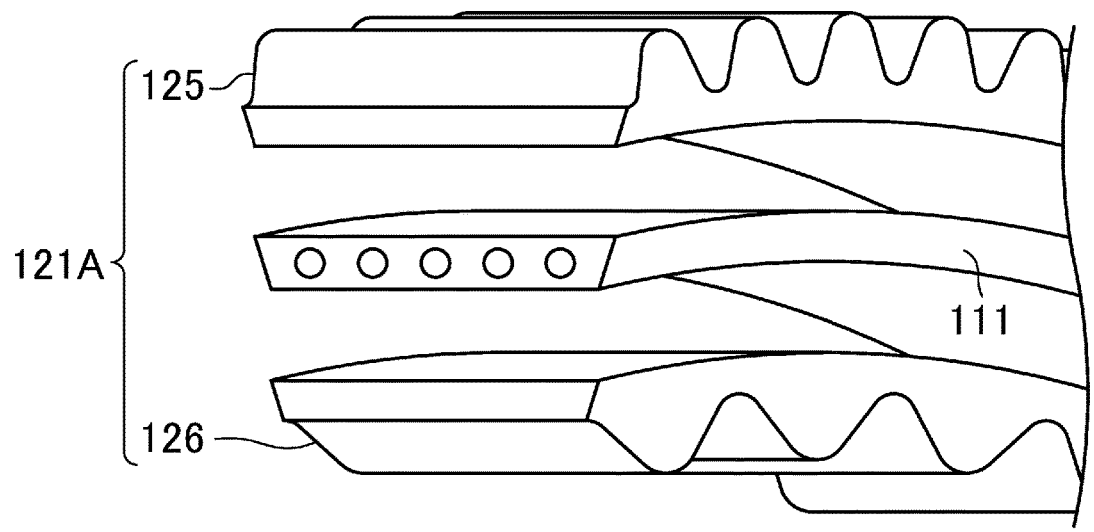
FIG. 13 illustrates a variation of the method of manufacturing a power transmission belt according to the embodiment.

Also, the rubber member 121A for the compressed rubber layer may be provided with regular roughness to provide a cogged belt. Further, as illustrated in FIG. 13, a double cogged belt may be provided in which compressed rubber layers are provided on both of the inner and outer circumferential surfaces of the tension member layer 111. In this case, a first rubber member 125 for a compressed rubber layer bonded to the inner circumferential surface and a second rubber member 126 for a compressed rubber layer bonded to the outer circumferential surface may be formed into different shapes. The first rubber member 125 for the compressed rubber layer and the second rubber member 126 for the compressed rubber layer may have different mixing compositions. The first rubber member 125 for the compressed rubber layer and the second rubber member 126 for the compressed rubber layer may be vulcanized under different conditions. This may easily provide, e.g., a double cogged belt.

Figure 14:
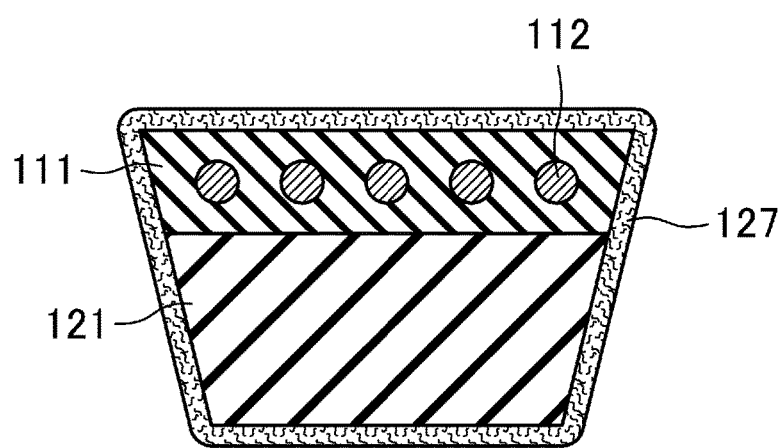
FIG. 14 is a cross-sectional view illustrating a variation of a power transmission belt according to the embodiment.

The power transmission belt of this embodiment may be a raw edge belt. Alternatively, a wrapped belt as illustrated in FIG. 14 may also be provided by bonding together the tension member layer 111 and the compressed rubber layer 121, and then, covering them with outer canvas 127.

Figure 15:
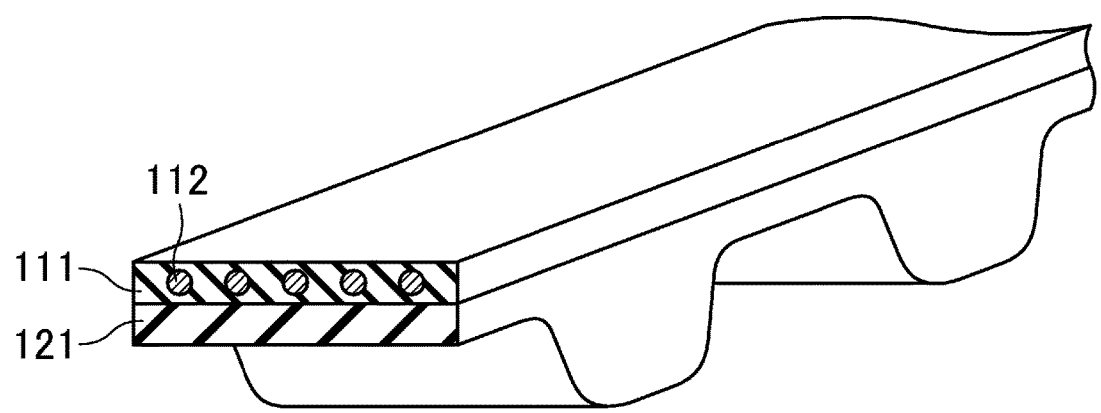
FIG. 15 is a perspective view illustrating a variation of a power transmission belt according to the embodiment.

The method of manufacturing the power transmission belt of this embodiment may also provide, e.g., a toothed belt illustrated in FIG. 15. The present disclosure is not limited to the above embodiment, and is applicable to various power transmission belts.

EXAMPLE

The present disclosure will now be described in detail using an example. However, the present disclosure is not limited to the example. A V-ribbed belt will be shown as the example.

<Tension Member Layer>

A first unvulcanized rubber sheet, which will serve as a cover rubber layer, was wound around the outer circumferential surface of a cylindrical molding drum with a smooth surface. Then, a second unvulcanized rubber sheet, which will serve as an adhesive rubber layer, was wound therearound. Next, previously treated cord was helically spun therearound, and a third unvulcanized rubber sheet, which will serve as an adhesive rubber layer, was wound therearound to produce a cylindrical laminated body. The laminated body on the mold was covered with a rubber sleeve, and was then heated (at 160° C.) and pressurized (at 1.0 MPa) in a vulcanizer to integrate the unvulcanized rubber sheets together. As a result, an endless tension member layer was produced.

The first unvulcanized rubber sheet, which will serve as a cover rubber layer, was produced with a mixing ratio shown in Table 1, and the second and third unvulcanized rubber sheets, which will serve as an adhesive rubber layer, were produced with a mixing ratio shown in Table 2. A Banbury mixer was used for the mixing. The first unvulcanized rubber sheet, which will serve as a cover rubber layer, had a thickness of 0.5 mm, and the second and third unvulcanized rubber sheets, which will serve as an adhesive rubber layer, had a thickness of 0.4 mm. The unvulcanized rubber sheets were each formed by calendar molding.

The cord was made of polyethylene terephthalate. The cord was immersed in an RFL treatment solution to perform a baking treatment several times. Thereafter, the cord was immersed in rubber cement to be heated and dried. Then, the cord was wound up to be used. The rubber cement was used by dissolving rubber compounding ingredients with the composition shown in Table 2 in toluene.

TABLE 1

|  | Part by Weight |
|---|---|
| EPDM | 100 |
| Carbon Black (FEF) | 50 |
| Paraffin Oil | 5 |
| Stearic Acid | 1 |
| Zinc Oxide | 5 |
| Antioxidant | 2 |
| Nylon Short Fibers | 20 |
| Vulcanization Accelerator TMTD | 1 |
| Vulcanization Accelerator MBT | 0.5 |
| Sulfur | 2 |
| Total | 186.5 |

TABLE 2

|  | Part by Weight |
|---|---|
| EPDM | 100 |
| Carbon Black (FEF) | 50 |
| Paraffin Oil | 5 |
| Stearic Acid | 1 |
| Zinc Oxide | 5 |
| Antioxidant | 2 |
| Vulcanization Accelerator TMTD | 1 |
| Vulcanization Accelerator MBT | 0.5 |
| Sulfur | 2 |
| Total | 166.5 |

<Rubber Member for Compressed Rubber Layer>

The rubber compounding ingredients with the composition in Table 1 were mixed using a Banbury mixer, and then, the mixed rubber compounding ingredients were formed into a pellet shape. The pellet-shaped rubber compounding ingredients were supplied to a single vent extruder having a die of rib grooves having the same width as the tension member layer to extrusion-mold an unvulcanized rubber member with rib grooves. Next, the rubber member was continuously vulcanized using the rotary curing press illustrated in FIG. 7. Specifically, the unvulcanized rubber member was continuously supplied with the ribs of the unvulcanized rubber member being fitted into the grooves of a metallic drum on its outer circumferential surface along its circumferential direction. The unvulcanized rubber member was sandwiched between the metallic drum and a steel band, and was continuously pressed and vulcanized at a predetermined temperature and a predetermined pressure to obtain a rubber member for a compressed rubber layer with ribs. The vulcanization temperature was about 160° C., the pressure was about 1.0 MPa, and the time was about 30 minutes.

<Bonding>

Bonding between the tension member layer and the rubber member for the compressed rubber layer, and bonding between both ends of the rubber member for the compressed rubber layer were performed using an adhesive rubber sheet. The adhesive rubber sheet had the composition shown in Table 3. The adhesive rubber sheet was mixed using a Banbury mixer, and then, calendar molding was performed to obtain a sheet having a thickness of 0.3 mm.

The obtained adhesive rubber sheet was wound around the tension member layer vulcanization-molded on the surface of a cylindrical mold. Next, a rubber member for the compressed rubber layer that had been pressed and vulcanized to have ribs and had been cut by an ultrasonic cutter to have a predetermined circumferential length was attached to the adhesive rubber sheet. The both ends of the rubber member for the compressed rubber layer in the length direction was diagonally cut at an angle of 45° so as to agree with each other. The cut surfaces were attached to each other by attaching an unvulcanized adhesive rubber sheet to the cut surfaces. Next, the surface of the molded body was covered with a rubber sleeve, and was heated and pressurized to bond together the tension member layer and the rubber member for the compressed rubber layer. The bonding was performed using a pressure oven at a temperature of 120° C. and a pressure of 1.0 MPa for four hours. Then, the resultant was cut to have a predetermined number of ribs (width) to produce a V-ribbed belt.

TABLE 3

|  | Part by Weight |
| --- | --- |
| EPDM | 100 |
| Carbon Black (FEF) | 50 |
| Paraffin Oil | 5 |
| Stearic Acid | 1 |
| Zinc Oxide | 5 |
| Antioxidant | 2 |
| Vulcanization Accelerator TMTD | 1 |
| Vulcanization Accelerator MBT | 1 |
| Sulfur | 2.5 |
| Total | 167.5 |

The method of manufacturing a power transmission belt according to the present disclosure hardly disorganizes the pitch of cord, and is useful as, e.g., a method of manufacturing a power transmission belt.

What is claimed is:

1. A method of manufacturing a power transmission belt, the method comprising:
   molding and vulcanizing an endless tension member layer in which a cord extending in a belt length direction and helically disposed with a predetermined pitch in the belt width direction is embedded;
   molding and vulcanizing a rubber member for a compressed rubber layer; and
   bonding together the endless tension member layer that has been vulcanized and the rubber member, that has been vulcanized, for the compressed rubber layer.

2. The method of claim 1, wherein
   the bonding includes pressing together a surface of the tension member layer and a surface of the rubber member for the compressed rubber layer which are activated by a free-radical initiator.

3. The method of claim 1, wherein
   the bonding is performed using an adhesive.

4. The method of claim 1, wherein
   the bonding includes bonding together the tension member layer and the rubber member for the compressed rubber layer with an adhesive rubber sheet interposed therebetween.

5. The method of claim 1, wherein
   the rubber member for the compressed rubber layer is formed by extrusion molding.

6. The method of claim 5, wherein
   in the bonding, both ends of the rubber member for the compressed rubber layer in a length direction are bonded together.

7. The method of claim 5, further comprising
   prior to the bonding, bonding together both ends of the rubber member for the compressed rubber layer in a length direction.

8. The method of claim 1, wherein
   the tension member layer and the rubber member for the compressed rubber layer are vulcanized under different conditions.

9. The method of claim 1, wherein
   the forming and vulcanizing the rubber member for the compressed rubber layer includes forming and vulcanizing a first rubber member for a compressed rubber layer, and forming and vulcanizing a second rubber member for a compressed rubber layer, and
   the bonding is bonding the first rubber member for the compressed rubber layer to an inner circumferential surface of the tension member layer, and bonding the second rubber member for the compressed rubber layer to an outer circumferential surface of the tension member layer.

10. The method of claim 9, wherein
    the first rubber member for the compressed rubber layer and the second rubber member for the compressed rubber layer are vulcanized under different conditions.

11. A power transmission belt manufactured by the method of claim 1.

12. The method of claim 1, wherein
    the molding and vulcanizing the endless tension member layer include
    inding a first unvulcanized rubber sheet around a molding drum,
    helically spinning a cord around the molding drum around which the first unvulcanized rubber sheet is wound,
    after spinning the cord, winding a second unvulcanized rubber sheet around the molding drum to produce a cylindrical laminated body,
    vulcanizing the cylindrical laminated body, and
    cutting the vulcanized cylindrical laminated body with a predetermined width.

13. The method of claim 6, wherein
    both ends of the rubber member for the compressed rubber layer in a length direction have uneven shapes complementary to each other, and the both ends of the rubber member for the compressed rubber layer in the length direction are bonded together.

* * * * *